(12) United States Patent
Brome et al.

(10) Patent No.: US 7,632,179 B2
(45) Date of Patent: Dec. 15, 2009

(54) SYSTEM AND METHOD FOR DETECTING COMBINE ROTOR SLUGGING

(75) Inventors: John G. Brome, Delavan, WI (US); Yun Ren Ho, Naperville, IL (US); Nicholas Laufenberg, Darien, IL (US)

(73) Assignee: CNH America LLC, New Holland, PA (US)

( * ) Notice: Subject to any disclaimer, the term of this patent is extended or adjusted under 35 U.S.C. 154(b) by 871 days.

(21) Appl. No.: 11/194,309

(22) Filed: Aug. 1, 2005

(65) Prior Publication Data

US 2007/0026910 A1 Feb. 1, 2007

(51) Int. Cl.
*A01D 75/18* (2006.01)
(52) U.S. Cl. .............................. 460/6; 460/1
(58) Field of Classification Search ........... 460/1, 460/6; 56/10.2 R, 10.3
See application file for complete search history.

(56) References Cited

U.S. PATENT DOCUMENTS

| | | | |
|---|---|---|---|
| 3,897,677 A | 8/1975 | Phoenix et al. |
| 4,143,664 A | 3/1979 | Chorney |
| 4,296,409 A | 10/1981 | Whitaker et al. |
| 4,337,611 A | 7/1982 | Mailander et al. |
| 4,376,298 A | 3/1983 | Sokol et al. |
| 4,527,241 A | 7/1985 | Sheehan et al. |
| 4,548,027 A | 10/1985 | Maeoka |
| 4,776,154 A | 10/1988 | Weiss et al. |
| 5,600,942 A | 2/1997 | Strosser |
| 5,699,247 A | 12/1997 | Moriya et al. |
| 5,873,227 A | 2/1999 | Arner |
| 5,889,671 A | 3/1999 | Autermann et al. |
| 6,208,925 B1 | 3/2001 | Creger et al. |
| 6,381,932 B1 | 5/2002 | Clauss |
| 6,405,114 B1 | 6/2002 | Priestley et al. |
| 6,695,693 B2 | 2/2004 | Ho et al. |
| 6,702,666 B2 | 3/2004 | Ho et al. |
| 6,726,559 B2 | 4/2004 | Bischoff |
| 6,726,560 B2 | 4/2004 | Ho et al. |
| 6,863,604 B2 | 3/2005 | Behnke |
| 7,427,231 B2 * | 9/2008 | Brome et al. ............ 460/1 |

(Continued)

FOREIGN PATENT DOCUMENTS

EP    0586999 A2    3/1994

(Continued)

OTHER PUBLICATIONS

U.S. Appl. No. 11/051,770 (not yet published), filed Feb. 4, 2005, titled "Active Combine Rotor Deceleration", John G. Brome, et al.

(Continued)

*Primary Examiner*—Alicia M Torres
(74) *Attorney, Agent, or Firm*—Michael G. Horms; John William Stader; Patrick M. Sheldrake

(57) ABSTRACT

A system to sense incipient slugging of a rotor by sensing a rotor speed signal, an engine speed signal and a first hydraulic motor speed signal, combining the rotor speed signal and the engine speed signal to provide a second hydraulic motor speed signal, and determining incipient slugging based upon the first and second speed signals, and thereby preventing potential damage to threshing components.

15 Claims, 3 Drawing Sheets

U.S. PATENT DOCUMENTS

| | | |
|---|---|---|
| 2001/0016794 A1 | 8/2001 | Falck et al. |
| 2003/0229432 A1 | 12/2003 | Ho et al. |
| 2004/0014509 A1 | 1/2004 | Brome et al. |
| 2004/0020198 A1 | 2/2004 | Brome et al. |
| 2005/0014603 A1 | 1/2005 | Brome et al. |
| 2005/0096810 A1 | 5/2005 | Mahoney et al. |

FOREIGN PATENT DOCUMENTS

| | | |
|---|---|---|
| GB | 2035029 A | 6/1980 |

OTHER PUBLICATIONS

U.S. Appl. No. 10/783,547 (not yet published), filed Feb. 20, 2004, titled "Method and Apparatus for Determining a Vehicle Gear Ratio", Yun Ren Ho, et al.

U.S. Appl. No. 10/756,857 (not yet published), filed Jan. 14, 2004, titled "Dual Power Path Drive for a Rotating Threshing Rotor . . . ", Aziz Talbi, et al.

* cited by examiner

SYSTEM AND METHOD FOR DETECTING COMBINE ROTOR SLUGGING

CROSS-REFERENCE TO RELATED APPLICATIONS

None.

FIELD OF THE INVENTION

The invention relates to agricultural combines and systems for controlling their operation. More particularly, it relates to control systems for controlling the speed of hydraulic motors that drive combine rotors. Even more particularly, it relates to control systems that prevent the overspeeding of hydraulic motors that drive combine rotors by detecting a "slugging" (rotor jamming) condition during threshing.

BACKGROUND OF THE INVENTION

Agricultural combines or "combine harvesters" are well-known for harvesting crops such as corn, soybeans, and wheat. The typical combine includes a self-propelled chassis supported on the ground via driving and driven wheels. A replaceable harvesting head is mounted on the front of the chassis for harvesting the crop of interest. The combine is operable to feed the harvested grain from the head to an internal threshing and separating system that separates the grain from stalks, pods, cobs, etc. (collectively referred to herein as "chaff") and that transfers the grain to an on-board storage hopper. The stored grain can be periodically transferred to a wagon or the like by an auger mounted on the chassis adjacent the storage hopper.

The threshing and separating system of the typical combine includes at least one threshing rotor, a concave, a grain pan, sieves and fans. Of these components, the rotor is of the most importance for purposes of the present invention. (The rotor(s) will hereafter be referred to in the singular for the sake of convenience, it being understood that the problems addressed by the invention, and the invention itself, are equally applicable to single rotor and multiple rotor systems). Torque is typically transferred to the rotor directly from the engine by a belt drive system that is engaged by a mechanical clutch. However, in order to increase the amount of crop processed by the combine, the size, weight and power consumption of the rotor are being increased to levels above the tolerances of belt driven technology. It is difficult to accelerate such a rotor from rest, particularly under certain crop conditions, because accelerating the high-inertia rotor places high stresses on both the belt drive and the clutch used to engage the belt drive. The loads imposed on the rotor after it is accelerated up to speed also can vary dramatically. The stress on the clutch and belt can be severe, resulting in early clutch and belt failure. Additionally, there are instances in which the combine encounters a "slug" condition in which the operator may determine that the crop is lodged between the rotor and concave. It may be desirable in this situation to permit the operator to control the rotor to reverse the direction of rotor rotation to deslug the rotor.

So-called "split-torque" or "hydro-mechanical" transmissions have been proposed to address these and other problems encountered when driving a threshing rotor. For instance, U.S. Pat. No. 5,865,700 to Horsch discloses a hydro-mechanical drive system including an engine and a hydrostatic motor which derives its power from the engine. A single clutch controls the input of the engine power and input of the hydrostatic motor power. As another example, U.S. Pat. No. 6,247,695 to Hansen discloses a combine in which an engine drives a wet clutch and a hydrostatic motor. U.S. Pat. Nos. 6,695,693 and 6,702,666 to Ho, Brome, and Bundy disclose a combine with a dual path drive system in which an engine drives the rotor through two paths: a hydraulic pump/motor path and a direct gear train path.

In the latter two patents, the two paths are joined at a planetary gear box, with the engine coupled to and directly driving a ring gear, and the hydraulic motor coupled to a new sun gear. The output planetary gears are coupled to the rotor through a gearbox. A microprocessor controls the speed of the rotor primarily by regulating the speed of the hydraulic motor driving the sun gear. In the preferred arrangement, the engine runs at a constant, optimum speed at which it is most efficient. An electronic controller connected to a rotor speed sensor is configured to vary the speed of the hydraulic motor until the rotor is operating at its optimum speed as well.

The addition of a motor also permits gradual acceleration which reduces shock to the system, but it also adds an additional component—the hydraulic motor—that itself is susceptible to damage under extreme operating conditions.

While CVT rotor (or feeder) technology exceeds the torque transfer limitation of belt-driven technology, it is still not immune to slugging. Wet crop conditions, high feed rates and sometimes crop types can cause the threshing system to draw more horsepower from the engine than what it was originally designed to consume. Any combination of these conditions can cause the engine, rotor and rotor motor to begin slowing down, eventually resulting in a jammed or slugged threshing system. Although there are means available to de-slug a rotor or feeder from the cab, this operation reduces productivity and increases complement failure possibility.

A further difficulty in predicting slugs on a CVT type split torque system is due to the range of operating speeds and directions of the hydraulic motor. In a split torque system, the motor can be run in either direction in order to give the system of full range of operating rotor speeds.

When the hydraulic motor rotates in a forward direction (motoring) sudden loads on the rotor act against the motor and tend to slow it down. The beginning symptoms of a slug condition are therefore (1) reduced engine RPM; (2) reduced rotor RPM and (3) reduced motor RPM. If slope thresholds (i.e. the rate of change) for each of these parameters are exceeded, a slug condition is likely occurring and may cause hydraulic system pressure to exceed the relief pressure (e.g. 6000 psi) until eventually the engine stops. However, the problem is made difficult, since not every reduction in motor speed is caused by slugging. An example of a circumstance that could prevent accurate slug detection would be if the engine power is consumed too much by other systems thereby reducing motor speeds for other reasons and masking the symptoms that might identify the beginning of a slug.

When the hydraulic motor rotates in a reverse direction, a rotor slug may occur more quickly and can be detected by evaluating the flow into and out of the hydraulic motor. With the hydraulic motor rotating in the reverse direction, sudden loads on the rotor act in the same direction and tend to speed up the hydraulic motor, making it go faster in a reverse direction. This is a particular problem, since the hydraulic motor may already be operating near its absolute speed limit. An increase in speed of just a few hundred RPM has the potential of damaging the hydraulic motor. If the difference in flow into and out of the hydraulic motor reaches a certain threshold, such as 1000 cc per second, damage to the hoses may occur due to the high pressure. The feeder and rotor should be stopped before the threshing system becomes jammed.

When a split torque system is subjected to severe and sudden loading, the driving torque applied to the rotor shaft by the engine and the motor rises extremely fast and extremely high as the rotor resists further rotation. This sudden increase in torque causes a corresponding increase in hydraulic pressure in the hydraulic lines providing the motor with hydraulic fluid. If this increase in hydraulic pressure is great enough, it will cause the pressure relief valve coupled to the hydraulic lines to open and the motor to overspeed.

Once the pressure reaches this threshold and the hydraulic conduits open, the motor can be accelerated by the applied torque to speeds outside its normal operating range, speeds that may damage the motor itself.

For example, a typical hydraulic motor driving a combine rotor operates at speeds of about +4000 to −4000 rpm. These motors are typically damaged when their speeds reach 5000-6000 rpm, for example. When a rotor is slugged, the sudden increase in engine torque applied to the motor shaft can open the pressure relief valve and accelerate the motor to speeds of 7000-10,000 rpm in the space of just a few seconds. When extreme motor overspeed occurs, the operator must immediately stop harvesting with the combine, and have the motor inspected, overhauled and/or replaced as necessary. This inspection and repair process can take days. Farmers will not tolerate a combine that is broken down for days during the harvesting season.

One way of preventing motor overspeed is to electronically monitor a motor speed sensor and disengage the motor from its load when it reaches an overspeed limit that is below a motor-damaging speed.

One difficulty with this solution is that the speed signal provided by the motor speed sensor has a significant noise component. It can vary substantially from sensor reading to sensor reading, sometimes indicating a speed that is higher than the true motor speed and sometimes indicating a speed that is lower than the true motor speed.

Disengaging the motor based on a signal from the speed sensor may generate too many false positives and false negatives. A "false-positive" is when the sensor indicates the motor is over speeding and it is not. A "false negative" is when the motor speed sensor does not indicate the motor is over speeding and it is. False positives are a problem because of the delay in harvesting. When the engine is disconnected and the rotor is shut, the operator must immediately stop the combine, climb out, and inspect the drive system to see whether the rotor is slugged. This takes time. False negatives are a problem because of the damage to the motor. If the system does not sense the motor overspeed condition, the motor can be damaged. This, too, delays harvesting.

What is needed, therefore, is an improved method and apparatus for detecting motor speed that decreases the false positives and the false negatives. It is an object of this invention to provide such a method and apparatus.

SUMMARY OF THE INVENTION

In accordance with the first embodiment of the invention, a method to sense incipient slugging in a combine having a rotor for threshing crop material, an internal combustion engine configured to be coupled to the rotor to drive the rotor; and a hydraulic motor configured to be coupled to the rotor to drive the rotor, is provided, the method comprising the steps of sensing a first motor speed with a motor speed sensor; sensing an engine speed with an engine speed sensor; sensing a rotor speed with a rotor speed sensor; combining the engine speed and the rotor speed to provide a second calculated motor speed; and determining incipient slugging based upon the first actual motor speed and the second motor speed.

The method may further comprise the steps of determining rates of change of a signal from the motor speed sensor, a signal from the engine speed sensor and a signal from the rotor speed sensor; and determining incipient slugging based upon the three rates of change. The motor may be driven by a hydraulic pump, and the method may also comprise the steps of determining a first flow rate of hydraulic fluid through the pump; determining a second flow rate of hydraulic fluid through the motor; determining a difference between the first and second flow rates, and determining incipient slugging based upon the difference. The step of determining incipient slugging may further comprise the steps of selecting a first threshold motor speed based at least upon a first selected gear ratio, and comparing the first and second motor speeds with the first threshold motor speed. The method may include the step of comparing the first and second motor speeds against a second threshold motor speed different from the first threshold motor speed when a second gear ratio different from the first gear ratio is selected. The method may also include the step of decoupling the rotor from both the engine and the motor based at least upon the step of determining.

In accordance with a second aspect of the invention, a system to sense incipient slugging in a combine having a rotor for threshing crop material, an internal combustion engine configured to be coupled to the rotor to drive the rotor; and a hydraulic motor configured to be coupled to the rotor to drive the rotor is provided, the system comprising at least one electronic controller; a motor speed sensor coupled to the at least one electronic controller and to the motor to sense a first motor speed; an engine speed sensor coupled to the at least one electronic controller and to the engine to sense the engine speed; a rotor speed sensor coupled to the at least one electronic controller and to the rotor to sense the rotor speed; wherein the electronic controller is configured to receive an engine speed signal from the engine speed sensor; receive a rotor speed signal from the rotor speed sensor; combine the engine speed signal and the rotor speed signal to provide a second motor speed; and determine incipient slugging based upon the first motor speed and the second motor speed.

The controller may be configured to determine rates of change of the motor speed signal, the engine speed signal and the rotor speed signal; and determine incipient slugging based upon the three rates of change. The motor may be driven by a hydraulic pump, and the controller may be further configured to determine a first flow rate of hydraulic fluid through the pump; determine a second flow rate of hydraulic fluid through the motor; determine a difference between the first and second flow rates, and determine incipient slugging based upon the difference. The controller may be configured to select a first threshold motor speed based at least upon a first selected gear ratio, and compare the first and second motor speeds with the first threshold motor speed. The controller may be configured to compare the first and second motor speeds against a second threshold motor speed different from the first threshold motor speed when a second gear ratio different from the first gear ratio is selected. The controller may be configured to decouple the rotor from both the engine and the motor based at least upon the step of determining.

In accordance with a third aspect of the invention, a system to sense incipient slugging in a combine having a rotor for threshing crop material, an internal combustion engine configured to be coupled to the rotor to drive the rotor; and a hydraulic motor configured to be coupled to the rotor to drive the rotor is provided, the system comprising means for sensing a first motor speed; means for sensing engine speed;

means for sensing rotor speed; and electronic control means, the control means further comprising: means for receiving an engine speed signal from the means for sensing engine speed; means for receiving a rotor speed signal from the means for sensing engine speed; means for combining the engine speed signal and the rotor speed signal to provide a second motor speed; and means for determining incipient slugging based upon the first motor speed and the second motor speed.

The means for controlling may further comprise means for determining rates of change of the motor speed signal, the engine speed signal and the rotor speed signal; and means for determining incipient slugging based upon the three rates of change. The motor may be driven by a hydraulic pump, and the means for controlling may further comprise means for determining a first flow rate of hydraulic fluid through the pump; means for determining a second flow rate of hydraulic fluid through the motor; and means for determining a difference between the first and second flow rates; and means for determining incipient engagement based upon the difference. The means for controlling may further comprise means for selecting a first threshold motor speed based at least upon a first selected gear ratio, and means for comparing the first and second motor speeds with the first threshold motor speed. The means for controlling may further comprise means for comparing the first and second motor speeds against a second threshold motor speed different from the first threshold motor speed when a second gear ratio different from the first gear ratio is selected. The means for controlling may further comprise means for decoupling the rotor from both the engine and the motor based at least upon the means for determining.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
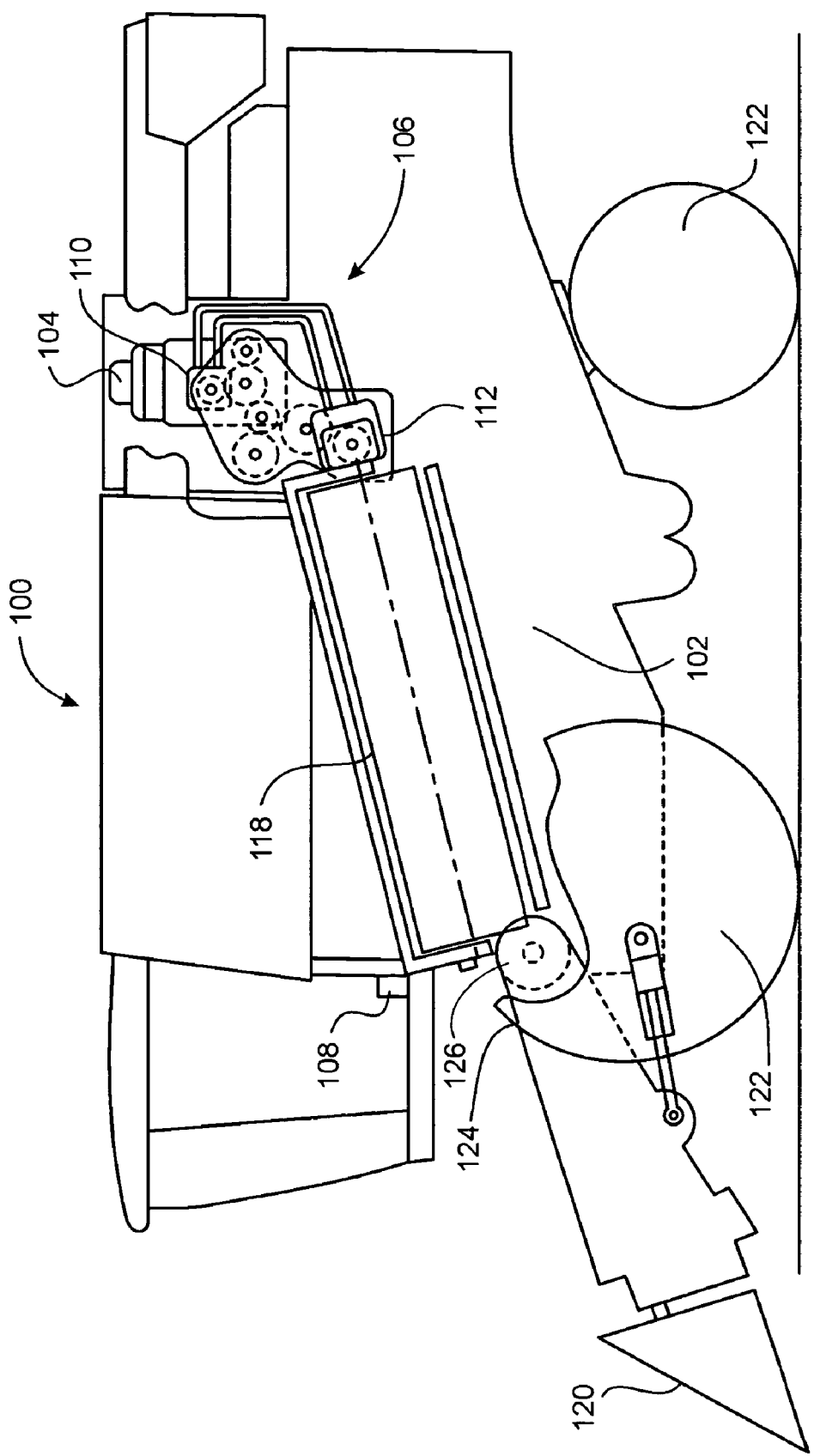
FIG. 1 is a side schematic view of an agricultural combine having a system for determining incipient slugging of the rotor in accordance with the present invention.
Figure 2:
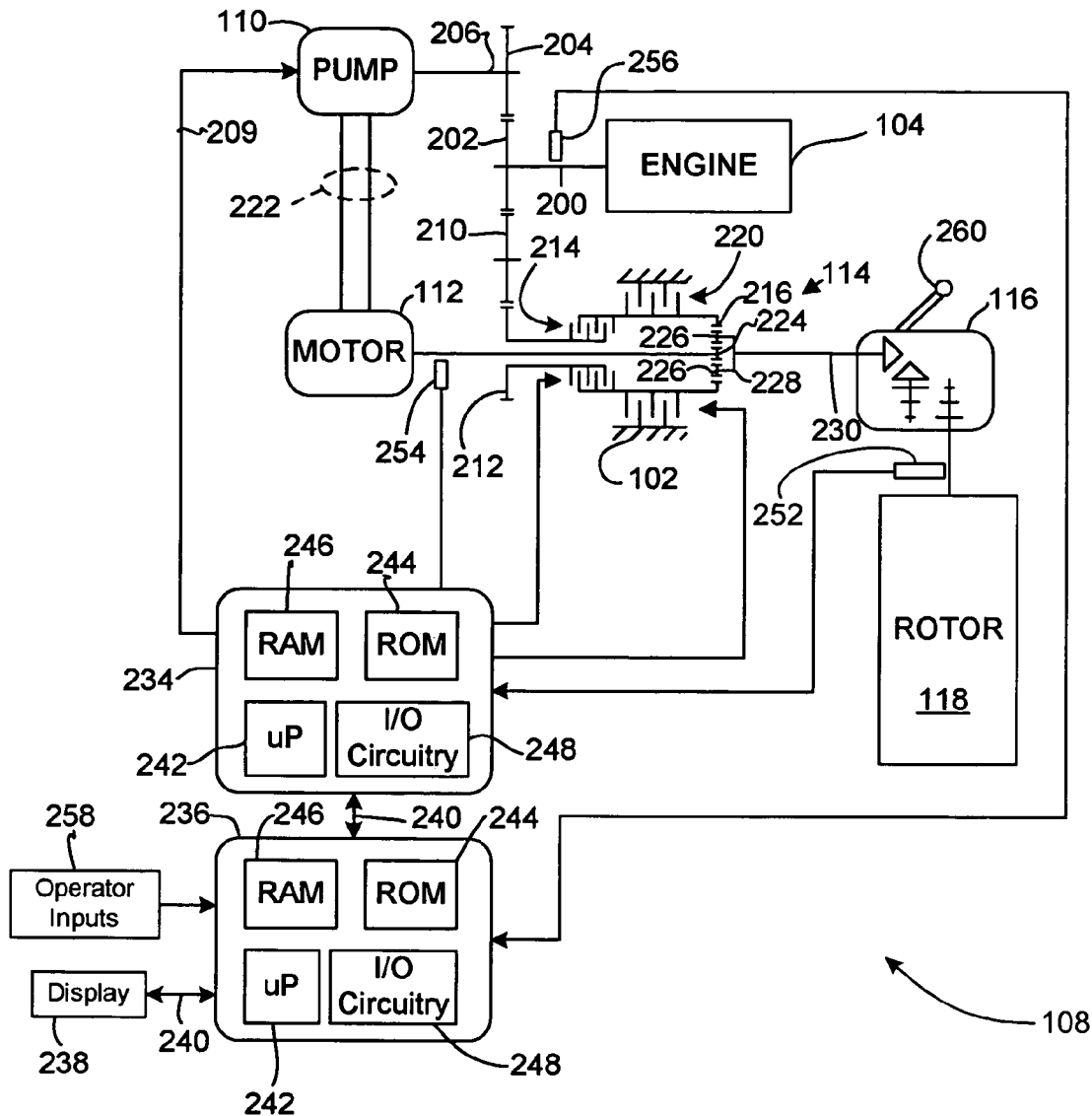
FIG. 2 is an electrical, hydraulic and mechanical schematic diagram of the system of FIG. 1 showing the electronic control system and sensor arrangement that is configured to determine incipient engagement.

Referring to FIGS. 1 and 2, a work vehicle is illustrated, here shown as an agricultural combine 100. The work vehicle has a chassis 102 on which an engine 104 is mounted. A drive system 106 is coupled to and driven by engine 104 to rotate rotor 118. An electronic control system 108 is coupled to the engine and the drive system to monitor various sensors, to control the engine and to control the drive system.

The engine 104 is preferably an internal combustion engine, such as a multi-cylinder gasoline or diesel engine.

The drive system 106 includes a hydraulic pump 110 that is coupled to and driven by the engine, a hydraulic motor 112 that is fluidly coupled to and driven by pump 110, gear trains coupling engine 104 to the pump, engine 104 to a planetary gear arrangement, the planetary gear arrangement itself, and a gearbox driven by the planetary gear arrangement that, in turn, drives the combine rotor 118.

Rotor 118 rotates with respect to chassis 102 and threshes agricultural material, such as corn or wheat. A header 120 is coupled to the front of the combine chassis to gather the agricultural material from the field and direct it into the rotor. The agricultural material is gathered by the header and cut. Once cut it falls into a header trough that includes an auger. The auger drives the agricultural material toward a feeder 124, which in turn conveys the agricultural material into the mouth of the rotor 118. The feeder is driven by a hydraulic motor 126 that is driven by engine 104.

Several wheels 122 are coupled to the chassis to engage the ground and support the combine as it travels over the ground. One or more hydraulic motors (not shown) are coupled to the wheels to drive the wheels in rotation, thereby driving the combine over the ground.

FIG. 2 illustrates construction details of the work vehicle (and particularly the rotor drive system) in a schematic form. Engine 104 has an output shaft 200 to which spur gear 202 is fixed. Gear 202 drives spur gear 204. Spur gear 204 is fixed to shaft 206, which is the input shaft to hydraulic pump 110.

Hydraulic pump 110 is a variable displacement pump in which the specific output can be varied under computer control. In particular, pump 110 has internal electronic actuators that vary the specific displacement of the pump in response to an electrical signal. Controller 234 applies the signal to pump 110 over electrical control lines 209.

Gear 202 also meshes with and drives spur gear 210, which is coupled to and drives the auger and header (not shown). Spur gear 210, in turn, meshes with and drives spur gear 212. Spur gear 212, in turn, is coupled to and drives the input shaft of engine-to-ring clutch 214.

Engine-to-ring clutch 214 is a hydraulically actuated multi-plate clutch that couples gear 212 (and hence engine 104) to ring gear 216 of planetary gear arrangement 114. When clutch 214 is engaged, engine 104 is coupled to and drives ring gear 216. When clutch 214 is disengaged, engine 104 is disconnected from ring gear 216. Engine-to-ring clutch 214 engages engine 104 not only to ring gear 216, but also to motor 112 and rotor 118. When clutch 214 is disengaged, and ring-to-frame clutch 220 is also disengaged, the engine, the motor, and the rotor all turn freely with respect to each other. Engaging ring-to-frame clutch 220 couples motor 112 to rotor 118. Engaging engine to ring clutch 214 engages the engine, the motor, and the rotor to one another to mutually drive (or be driven) by each other. Indeed, during slugging conditions, when the rotor is slugging cannot turn, engine 104 drives motor 112 to a complete stop, and then in a reverse direction.

A second clutch 220 (a ring-to-frame clutch) is coupled to and between ring gear 216 and the frame or chassis 102 (indicated by the ground symbol) to fix the ring gear with respect to the chassis or frame of the vehicle. When clutch 220 is engaged, ring gear 216 is fixed and cannot rotate.

Pump 110 is hydraulically connected to motor 112 by hydraulic conduits 222. These conduits conduct fluid to and from motor 112 to form a closed loop hydraulic (hydrostatic) drive circuit. Pump 110 provides flow in both directions through conduits 222 that couple pump 110 to motor 112. Pump 110 includes control circuitry that changes the pump's specific displacement to provide reversible flow through conduits 222 between a maximum flow rate in a one direction to a maximum flow rate in the opposite direction. This flow can be continuously and proportionally varied between a forward direction maximum flow rate to a reverse direction maximum flow rate in response to signals applied to signal lines 209 by controller 234.

Motor 112 is coupled to and drives sun gear 224 of planetary gear arrangement 114. Sun gear 224 drives planet gears 226, which drive planetary gear carrier 228.

Gearbox 116 is a multi-speed gearbox having three manually selectable gear ratios with an input shaft 230 and an output shaft coupled to rotor 118. It is shifted to alternatively select one of the three gear ratios by manual manipulation of gearshift lever 260.

Input shaft 230 of gearbox 116 is fixed to and rotates together with planetary gear carrier 228. The output shaft 231 of multi-speed gearbox 116 is coupled to and drives rotor 118.

It should be clear that power from engine 104 to rotor 118 follows two parallel paths. The first path is from engine 104, though the gearing, through clutch 214, through planet gears 226 and into shaft 230. The second parallel path is from engine 104, through pump 110, through motor 112, through sun gear 224, through the planet gear 226 and into shaft 230.

In a normal mode of operation, power through both paths is provided to the rotor. Engine 104 operates most efficiently at a set and predetermined rpm, yet the rotor cannot be operated at a set, predetermined speed, but must be variable over some range or ranges of speed to harvest the several types of crops it is intended and designed to do.

To provide this variable rotor speed, the parallel power path from engine 104 through pump 110 and motor 112 to the sun gear is provided. The planetary gear arrangement permits power through both paths to be applied to the rotor. The motor drives the sun gear, the engine drives the ring gear. The planetary gear carrier is coupled to and driven by both the sun and ring gears and applies that combined power to the rotor through gearbox 116.

The rotor speed is not varied by varying the engine speed and the ring gear speed, which are constant. The rotor speed is generally varied by controller 234 which varies the motor speed. Controller 234 accomplishes this by varying the specific displacement of pump 110.

Electronics

An electronic control system 108, including three digital controller circuits and their associated sensors, controls the operation of the foregoing machine elements.

The system 108 includes a first digital controller 234, a second digital controller 236 and a third digital controller 238 that are coupled together over a serial communications network, here shown as a CAN bus 240 that operates in accordance with the SAE J1939 communications standard.

Each controller circuit 234, 236, and 238 are similarly constructed, and include a microprocessor 242, a read-only memory (ROM) 244, a random access memory (RAM) 246 and an input/output (I/O) circuit 248. The ROM includes a control program that controls the operation of the controller. The RAM is temporary storage space for numeric values used in computation, and the I/O circuit is configured to process and condition external communication signals including communications with the sensors and the other controllers on the CAN bus 240. Each of these circuits is connected using a data/address/control bus of standard design, which is not shown. The controllers are connected to one another.

The first digital controller 234 is connected to two speed sensors, a rotor speed sensor 252, and a motor speed sensor 254. These sensors are respectively coupled to rotor 118 and motor 112 to sense the rotational speeds of these devices and transmit a signal indicative of those speeds to the first digital controller 234.

The speed sensors in the present system preferably generate a series of pulses as the devices to which they are coupled rotate. The faster the engine, rotor and motor turn, the faster the stream of pulses coming from the sensors arrives at controllers 234 and 236.

Common sensor arrangements that generate such pulse sequences include Hall effect devices and inductive pickups that sense the passage of slotted disks mounted on the shafts of the engine, rotor and motor.

The first digital controller 234 is also connected to and controls three other devices: pump 110, engine-to-ring clutch 214 and ring-to-frame clutch 220. Controller 234 generates and transmits a signal indicative of a desired specific pump displacement to pump 110 over electrical signal lines 209. Pump 110 responsively changes its specific displacement to match the signal. In a similar fashion, controller 234 generates and transmits a clutch-engaging or clutch-disengaging signal to electrical solenoid valves (not shown) that conduct hydraulic fluid to and from the two clutches 214 and 220. The clutches responsively engage and disengage.

The I/O circuit of second digital controller 236 is connected to an engine speed sensor 256 and to operator input devices 258. Engine speed sensor 256 generates a signal indicative of the engine speed, typically by generating a pulse train similar to the motor speed sensor. The operator input devices 258 include a switch responsive to operator manipulation that generates two separate signals, an "increase rotor speed" signal and a "decrease in rotor speed" signal. Operator input devices 258 also include a separator switch that engages the separator section of the combine 100, turning the rotor on and off. Controller 236 is also connected to controller 234 and controller 238 via the CAN bus.

The third and final controller, controller 238, is a display controller. It is constructed the same as controller 234 and 236, but is dedicated to displaying data generated by the operator or the other controllers. This capability is provided by its own internal control program stored in its ROM memory. It includes a display device such as an LCD or electroluminescent display. It is coupled to the other controllers over CAN bus 240.

Programming

Controllers 234, 236, and 238 include internal digital control programs that control their operation. These programs are stored in the ROM memory of each controller. The programmed operation of each controller is discussed below.

During normal operation, controller 238 displays several data indicative of the vehicle's status. The first of these, the rotor speed, indicates the speed of the rotor. Controller 234 generates the rotor speed data from the rotor speed signal transmitted to controller 234 from rotor speed sensor 252. Controller 234 periodically calculates the rotor speed from the rotor speed signal and places this information on the CAN bus. The rotor speed is preferably calculated and placed on the CAN bus every 10 milliseconds.

Controller 238 is programmed to receive this rotor speed data over the CAN bus, and to translate them into display signals to drive its integral display. It applies the display signals to the display, thereby generating decimal digits on the display that represent the rotor speed. The display indicates the rotor speed as a sequence of decimal digits expressed in revolutions per minute.

Controller 238 receives these speed range signals, translates them into display signals to drive its integral display, and applies the signals to the display thereby generating decimal digits on the display that represent the upper and lower rotor speed limit values. These values are preferably expressed in revolutions per minute.

Controller 236 receives an increase-rotor-speed signal and a decrease-rotor-speed signal (also known as operator speed requests or commands) from operator input device 258. These signals are generated by input device 258 when the operator manipulates device 238. Controller 236 transmits these operator requests on the CAN bus.

Controller 234 receives these operator requests and determines whether or not to change the speed of the rotor in response. If it decides that the rotor speed can be changed, it increases the flow rate of fluid through the pump in a first flow direction.

Controller 234 controls the rotor speed by regulating the specific displacement of pump 110. When the operator, using the operator input device 258, commands an increase or decrease in rotor speed, controller 234 is programmed to change the displacement of pump 110 accordingly.

Controller 234 changes the rotor speed based on two things: first, a command by the operator using the operator input device to either raise or lower the current rotor speed, and second, controller 234's determination that the rotor can indeed be raised or lowered as requested by the operator. If both conditions are met, controller 234 changes the specific displacement of the pump to either raise or lower the rotor speed.

Controller 234 also determines whether the motor or the engine (or both) drives the rotor by selectively engaging and disengaging the engine-to-ring clutch 214 and the ring-to-frame clutch 220. In the discussion below, controller 234 transmits engagement and disengagement signals to the hydraulic valve (not shown) that controls the engine-to-ring clutch, causing it to become engaged (thereby connecting the engine to the ring gear) and disengaged (breaking the engine-to-ring gear drive connection). Controller 234 also transmits engagement and disengagement signals to the hydraulic valve (not shown) that controls the ring-to-frame clutch, causing it to engage (locking the ring with respect to the chassis or frame) and disengage (releasing the ring to rotate with respect to the chassis or frame).

In the normal operating mode, both the motor and the engine drive the rotor. In this mode, also called the hydro-mechanical mode, the engine runs at a relatively constant speed of 2100 rpm which, through the gearing and engine-to-ring clutch 214 connecting the engine to the ring gear, causes the ring gear to rotate at about 2188 rpm.

The motor 112 is designed to be bi-directionally driven over a range of speeds from about −4100 rpm to +4000 rpm, although controller 234 attempts to prevent the motor from reaching these design limit speeds, being programmed instead to operate the motor over reduced range of speeds the changes depending upon what gear ratio the operator has selected in gearbox 116.

The rotor cannot be driven at an infinite number of speeds in the normal (hydro-mechanical) mode since the motor has a limited range of operating speeds, the engine operates at a relatively fixed speed, and gearbox 116 has a predetermined set of gear ratios. By "gear ratio" we mean the ratio of gearbox input shaft speed versus gearbox output shaft speed. Given these constraints, for any selected gear ratio of gearbox 116, there is an associated and predetermined range of permissible rotor speeds. These speeds are expressed as a rotor speed upper limit and a rotor speed lower limit. Again, each of the selectable gear ratios of gearbox 116 has an associated and different rotor speed upper and lower limit.

The input shaft 230 of gearbox 116 is connected to and driven by the planetary gear carrier 228. The gearbox has three different selectable gear ratios—ratios of gearbox input shaft to output shaft speeds. These gear ratios are selectable by manual operator manipulation of a conventional gearshift lever 260.

Gearbox 116 provides three separate gear ratios, generally identified as high, medium, and low. In the high gear ratio, the ratio of gearbox input shaft speed to gearbox output shaft speed is 1:1.94 in the medium gear ratio, the ratio of gearbox input shaft speed to gearbox output shaft speed is 1:2.93 in the low gear ratio, the ratio of gearbox input shaft speed to gearbox output shaft speed is 1:5.16. These ratios are not variable. The gearbox is either in high, medium, or low, and the gearbox speed ratios are any one of the three ratios identified above, much the same as the multiple gear ratios that a manual transmission provides in an automobile.

Depending upon the current gear ratio, controller 234 is configured to vary the speed of motor 112 as needed to provide the output speed commanded by the operator. Motor 112 cannot operate at every possible speed in every possible gear ratio, however. The speed of the motor is regulated by controller 234 and it only provides motor speeds in the following ranges. When gearbox 116 is in high gear, controller 234 is configured to vary the motor speed between −2180 and 3025 rpm. When gearbox 116 is in medium gear, controller 234 is configured to vary the motor speed between −3125 and 3025 rpm. When gearbox 116 is in low gear, controller 234 is configured to vary the motor speed between −3980 and 3025 rpm. Controller 234 changes the speed of the motor by varying the displacement of pump 110 by transmitting a signal to the pump over signal line 209.

Engine 104 has an internal governor that attempts to keep the engine rotating at 2100 rpm during harvesting operations. In other words, 2100 rpm is the engine's command speed. This speed is selected since it is the optimum speed of rotation for engine 104 under a variety of load conditions, and therefore it is desirable to keep engine 104 at this speed as much as possible.

With engine 104 rotating at a constant speed of approximately 2100 rpm, and with the controller burying the motor speeds in each of the three gear ratios as described above, and given the three gear ratios themselves, the operator can command the rotor to rotate at speeds in the following three speed ranges depending upon the gear ratio selected by the operator. When the gearbox is in low gear, controller 234 can vary the speed of the rotor from 216 to 450 rpm by changing the speed of the motor from −3980 to 3025 respectively. When the gearbox is in medium gear, controller 234 can vary the speed of the rotor from 430 to 780 rpm by changing the speed of the motor from −3125 to 3025, respectively. When the gearboxes in high gear, controller 234 can vary the speed of the rotor from 730 to 1180 rpm by changing the speed of the motor from −2180 to 3025, respectively.

The operator chooses a rotor speed by shifting gearbox 116 into the proper speed range, then adjusting the switch of the operator input devices 258 to generate the "increase rotor speed" or "increase rotor speed" speed signals until his desired command rotor speed has been selected. To give the operator some visual feedback, controller 234 is configured to transmit the rotor speed over the CAN bus to controller 238 where it is displayed for the operator to see.

The operator cannot select any rotor speed in any gear ratio, however. As explained in the paragraphs above, each gearbox gear ratio has its own associated range of rotor speeds. To assist the operator, controller 234 signals the operator when the selected speed range has reached its limit by displaying a message indicating "shift up" or "shift down". By looking at the displayed rotor speed when the message appears, the operator can determine the speed range limits and know the rotor speed at any time.

Response to Gradual Load Changes

During normal operations, the operator keeps the combine traveling through the field at a constant speed, the operator keeps the rotor turning at a constant speed, the operator keeps the engine turning at a constant speed, and the operator keeps the feeder feeding the rotor at a constant speed. This is the preferred mode of operation. Gradual fluctuations in load such as those experienced by the combine 100 as it travels through a typical agricultural field will cause the speed of the rotor, engine, and motor to drift slightly from their set points. These gradual changes in speed are due to gradual load changes, which are not eliminated by the control system described herein.

Controller 234 controls the rotor speed by changing the specific displacement of the pump whenever the operator commands a rotor speed increase or decrease. Controller 234 does not actively control the speed of the rotor using any feedback mechanism. Thus, as the load increases or decreases on the rotor, the engine may slow down or speed up in response. The pump will also speed up or slow down in proportion to the increase or decrease in motor speed since they are coupled together with a fixed ratio gear train. Further, since controller 234 does not change the displacement of the pump (until commanded by the operator to increase or decrease rotor speed), the output of the pump and hence the speed of the motor also change proportionally to these changes in engine speed.

To increase the rotor speed through operator command input, the controller 234 increases the velocity of the motor by increasing its speed, if it is rotating in a forward direction, or by decreasing its speed if it is rotating in a reverse direction. To decrease the rotor speed through operator command input, the controller 234 decreases the velocity of the motor by decreasing its speed, if it is rotating in a forward direction, or by increasing its speed if it is rotating in a reverse direction. The speed of the engine is maintained substantially constant by the engine governor.

Controller 234 increases the velocity and decreases the velocity of the motor by changing the specific displacement of pump 110 over signal lines 209.

When motor 112 is rotating in its reverse or negative direction, it is "pumping", since the planet gears are driving the motor in its reverse direction and pumping hydraulic fluid out of the motor. When motor 112 is rotating in its forward or positive direction, it is "motoring", since the planet gears are being driven by the motor.

Response to Severe Load Changes and Motor Overspeeding

The controller 234 can easily respond to command input changes. It does not respond rapidly to sudden or extreme load changes. Sudden load changes will occur periodically in combine 100 when a large amount of agricultural matter is suddenly fed into the mouth of the rotor, or when a large piece of dirt, or branch is drawn into the mouth of the rotor, for example. When the rotor gets suddenly plugged like this, the rotor suddenly meets a great deal of rotational resistance. This sudden rotational resistance due to a sudden excess of material in the rotor is called "slugging".

Typically, this increased load on the rotor is communicated backward through the gearbox and planetary gear system to both the engine and the motor. The engine 104 has sufficient inertia that its speed will not change extremely rapidly. The operator may become aware that the rotor is slugging (if at all) only because of a slight decrease in engine speed. But these speed decreases may be quite small since the engine governor responds automatically to increases in engine load and slight decreases in engine speed by automatically opening the engine throttle and increasing the torque (and horsepower) generated by the engine.

The effect on the motor, however, is not as benign. The motor has little or no inertia to protect itself, nor is it capable of the sudden increases in power output that the engine is. Furthermore, the additional load on the rotor is communicated to the motor as a sudden and often radical increase in pressure. If the pressure becomes too high, pressure relief valves (not shown) that are typically coupled between the motor and the vehicles reservoir or tank can "pop", or open suddenly and dramatically. This allows the flow of oil an alternate path back to tank and can permit the motor to decelerate extremely quickly to a much lower velocity.

If the motor is being driven in a positive direction, a sudden increase in load caused by slugging can cause the motor to slow down, stop, reverse direction, and accelerate to a high motor-damaging speed in the motor's reverse direction of rotation. This process can happen quite rapidly, in less than 500 ms. While dangerous, there is at least some advance warning of problems since the motor must first slow down, stop, reverse direction, and accelerate in its reverse direction before reaching the high motor-damaging speeds.

If the motor 112 is being driven in a reverse direction (i.e. is "pumping"), a sudden increase in load can cause the motor to suddenly accelerate to a high motor-damaging speed in the motor's reverse direction of rotation. This is a particular problem when the motor is traveling in a reverse direction, since there is much less time to react as compared to the situation when the motor is rotating in a positive direction when the sudden load is applied.

To prevent slugging from causing damage when system 108 senses an incipient slugging condition, system 108 is programmed to disengage the engine-to-ring clutch. When system 108 disengages the engine-to-ring clutch, it disengages the ring gear from the engine, hence the engine can no longer apply a torque to the motor, hence the hydraulic fluid pressure developed in reaction to this torque disappears, hence the pressure relief valve (not shown) closes in the pump/motor circuit, and hence motor rapidly returns to its commanded speed with the ring gear and engine turning freely. All this is provided by disengaging the engine to ring clutch. This overspeed protection is supplemental to the control described above, and is triggered by the detection of an incipient slugging condition. Since the planetary gear system is a three input system, disengaging the engine-to-ring clutch thereby permitting the ring gear to rotate freely also disengages the hydraulic motor from the rotor as well. The hydraulic motor returns to its controlled speed and the rotor stops rotating.

This does not solve the problem as far as the operator is concerned, however. When the engine to ring clutch is disengaged, the rotor immediately stops, slugged. The operator must now manually de-slug the rotor by releasing the rotor cage that surrounds a rotor and gently, and slowly rotating the rotor until all the plant matter has been threshed out of the rotor. Since the rotor has stopped, no harvesting can be performed and the operator must immediately stop the combine there in the field until he can clear the slug and bring the rotor back up to its commanded speed for harvesting. Only then, when the rotor is again rotating at its command speed, can the operator start the combine moving through the field again.

This process of stopping the combine, clearing the rotor, and in spooling the rotor up to its command speed can take anywhere from five to 10 minutes of the operator's time. Time clearing slugs is time that is not spent harvesting crop. It is completely non-productive.

It should be clear that the rotor should be disengaged only when absolutely necessary. Determining incipient slugging, however, is not a trivial task. In the system described herein, there are three elements, the motor, engine, and rotor connected to a three input system, the planetary gearbox. Further complicating any dynamic analysis and prediction is the addition of a three speed gearbox 116. As an additional complication, the engine has its own governor separate from the slugging detection of system 108 that has its own dynamic response. Another problem is the dynamic lag in the pump and motor pair together with their hydraulic lines.

Perhaps the easiest solution to the problem is to look at the hydraulic pressure in the hydraulic lines that carry the fluid driving the motor. Any sudden spike in pressure, particularly a pressure high enough to pop the pressure relief valve and permit the motor to spin freely is of particular concern. In a system such as the present system which does not monitor hydraulic pressure in the hydraulic lines coupling the motor to the pump, the problem is much more complex, and the applicants have had to provide a much more creative solution to the problem of anticipating incipient slugging and disengaging the rotor from the engine.

Figure 3:
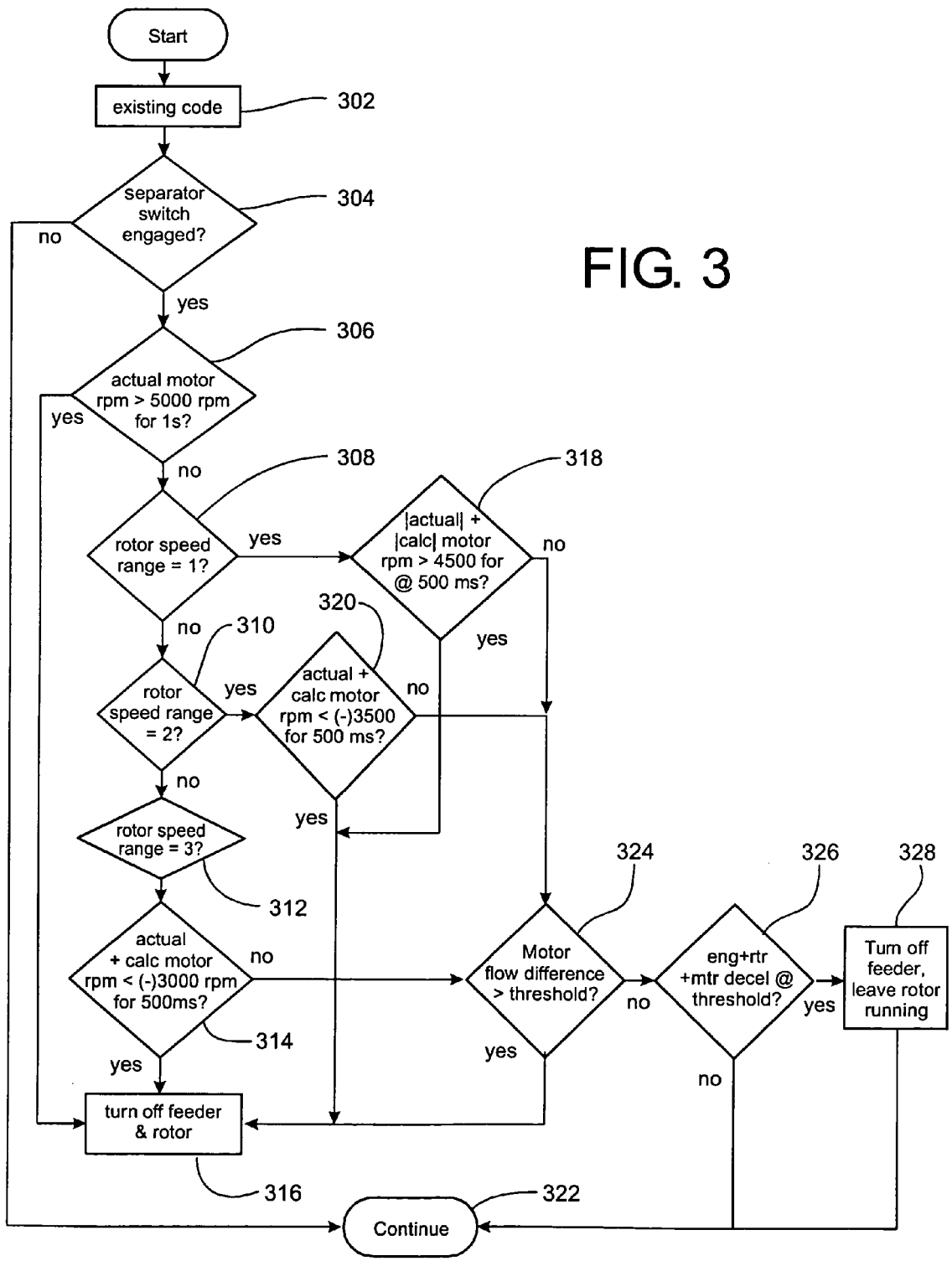
FIG. 3 is a flow chart illustrating the steps of determining incipient slugging that are performed by the electronic control system of FIGS. 1 and 2.

FIG. 3 is a flowchart illustrating the process by which system 106 detects incipient slugging. The steps in this process are performed by controller 234, which monitors motor speed, rotor speed, and engine speed to determine incipient slugging.

The steps illustrated in FIG. 3, like the other steps performed by controller 234, are repeated at regular intervals, preferably every 10 milliseconds. Controller 234 may perform the steps at different time intervals, either longer or shorter than the preferred 10 ms depending upon the system dynamics, the particular construction of system 108, and the speed and capability of the controllers, among other considerations.

As a preliminary remark, it must be noted that the steps illustrated in FIG. 3 do not detail all the processes performed by system 108. They represent just a few of the steps, processes, or operations performed by system 108. They do not detail how the operator starts the rotor and accelerates the rotor to its command speed. They do not detail how the controllers display information on the display 236 nor how they respond to operator changes in operator input devices 258.

Step 302 in FIG. 3 represents the existing rotor control programming programmed into and performed by controller 234. This programming includes the programs executed by controller 234 to accelerate the rotor to a desired speed. Related programs executed by controller 234 are discussed in the related applications mentioned above, and therefore are not discussed herein in detail.

In step 304 controller 234 checks to see whether the separator switch of operator input devices 258 is engaged or turned on. The separator switch is the switch the operator throws in order to turn on the rotor and cause it to start turning. If the separator switch is turned off, the operator is not using the rotor, and therefore any test to see whether the up rotor is turning to fast or to slow would be pointless. Hence, if controller 234 determines that the separator switch is not engaged, controller 234 exits the program by going to the step 322. On the other hand, if the separator switch is engaged or turned on, controller 234 continues processing at step 306.

In step 306, controller 234 checks to see whether the actual motor speed (whether rotating in a forward or reverse direction) is greater than 5000 rpm and has been greater than 5000 rpm for at least one second. In one embodiment, controller 234 increments a counter each time it performs this step if the speed is over 5000 rpm. Whenever the speed is below 5000 rpm, controller 234 resets the counter to zero. Since, in the preferred embodiment, controller 234 executes this loop every 10 ms, controller 234 will know that the rotor speed has been above 5000 rpm for at least one second when the counter reaches a value of 100.

Controller 234 determines the actual motor RPM by reading motor speed sensor 254. The purpose of this block is to make sure the motor never exceeds a maximum rotational speed. Whether the motor has a speed of 5000 rpm in a forward direction, or has a 5000 rpm speed in a reverse direction makes no difference. Either 5000 rpm in a forward rotational direction or 5000 rpm in a reverse rotational direction is close enough to a damaging speed such that controller 234 must react.

If the motor speed is greater than 5000 rpm, controller 234 continues on to step 316 in which it turns off both the feeder and the rotor. Controller 234 turns off the feeder because the feeder supplies the input of the rotor with just-cut plant material for threshing. If the rotor alone is turned off, and the feeder continues operating, the feeder will continue filling the inlet of the rotor with cut plant material. This makes the job of deslugging (cleaning out) the rotor much more difficult.

The rotor is turned off in step 316 by disengaging the engine to ring clutch. Once the engine to ring clutch is disengaged, the ring gear can spin freely, permitting the motor 112 to return to its commanded speed, the engine to return to its commanded speed, and the rotor 118 to stop. When the engine to ring clutch is disengaged, the engine, rotor and motor are drivingly disengaged from each other: none of them are able to transfer torque to any of the other two. The feeder is also turned off in step 316 by controller 236.

If the answer to the test in step 306 is "no", meaning that the motor has not been above the 5000 rpm threshold for at least one second, then processing continues to step 308. In step 308, controller 234 checks its memory to determine whether gearbox 116 is in low ("1") gear. If so, the rotor is operating in its lowest speed range, in which the speed of the rotor 118 between 216 rpm and 450 rpm, and the speed of the motor 112 between −3980 rpm and 3025 rpm. Whenever the rotor speed is outside this range or the motor speed is outside this range it is likely because a sudden load increase on the rotor (e.g. incipient slugging).

If gearbox 116 is in first gear, and therefore the rotor speed range is 1, controller 234 continues processing at step 318. If gearbox 116 is not in first gear, and therefore the rotor speed range is not the first or lowest speed range ("1"), controller 234 continues processing at step 310.

In step 310, controller 234 determines whether the rotor speed range is 2, in other words, whether gearbox 116 is in its medium or second gear. If it is in second gear, the rotor is operating in its middle speed range ("2") in which the speed of the rotor 118 between 430 rpm and 780 rpm, and the speed of the motor 112 is between −3125 rpm and 3025 rpm. Again, whenever the rotor speed is outside this range or the motor speed is outside this range it is likely because a sudden load increase on the rotor.

In step 312, controller 234 determines whether the rotor speed range is 3. In other words, whether gearbox 116 is in its high or third gear. If it is in third gear, the rotor is operating in its high speed range ("3") in which the speed of the rotor 118 is between 730 rpm and 1180 rpm, and the speed of the motor 112 is between −2180 rpm and 3025 rpm. Again, whenever the rotor speed is outside this range or the motor speed is outside this range it is likely because a sudden load increase on the rotor. If the gearbox 116 is in speed range "3", controller 234 continues processing at step 314. If it is not, controller 234 continues processing at step 322.

Depending upon which of three different gear ratios in gearbox 116 has selected, controller 234 applies one of three different speed tests to determine whether incipient slugging exists, and hence whether the feeder and rotor should be immediately turned off. The speed test in step 318 is performed whenever gearbox 116 is in first (low) gear and therefore the rotor speed range is 1. The speed test in step 320 is performed whenever gearbox 116 is in second (medium) gear and therefore the rotor speed range is 2. The speed test in step 314 is performed whenever gearbox 116 is in third (high) in gear and therefore the rotor speed range is 3.

Controller 234 performs three different tests of motor speed since the motor has a different commanded speed range for each of the three rotor speed ranges. Since the motor is only permitted to operate at certain speeds that differ in each of the three speed ranges, different tests for excessive motor speed in each of the speed ranges are appropriate.

If the rotor speed range is 1 in step 308, controller 234 continues to step 318. In step 318, controller 234 checks whether both the actual motor speed and they calculated motor speed have been greater than 4500 rpm for at least 500 ms. if they have been, then processing continues to step 316 in which the feeder and rotor are turned off. The actual motor speed is sensed by motor speed sensor 254. The calculated motor speed is determined by engine speed sensor 256 and rotor speed sensor 252.

The calculated motor speed is the speed the motor would have, based upon the gear ratios of the various gears in combine 100 and the currently selected gear ratio of gearbox 116, and assuming that the engine to ring clutch isn't slipping. If the engine to ring clutch is not slipping, and the engine speed and rotor speed and selected gear ratio of gearbox 116 are known, the motor speed can be calculated. This is precisely what controller 234 is programmed to do. Based upon its knowledge of the selected gear ratio, the speed signals from the rotor speed sensor and the engine speed sensor it calculates what the motor speed should be—again assuming that the engine to ring clutch is not slipping. As long as the engine to ring clutch is not slipping, the motor speed indicated by the motor speed sensor 254 will equal the calculated motor speed.

If the rotor speed range is 2 in step 310, controller 234 continues to step 320. In step 320, controller 234 checks whether both the actual motor speed and the calculated motor speed are greater in magnitude than 3500 rpm when the motor is turning in its reverse or negative direction for at least the previous 500 ms. Expressing this in slightly different language, controller 234 checks to see whether the actual motor velocity and calculated motor velocity are less than (i.e. more negative than) −3500 rpm for at least the previous 500 ms. if so, controller 234 continues to step 316 and turns off the feeder and the rotor.

As explained above, when the rotor starts to slug, the torque applied to the rotor increases dramatically and rapidly. This increased torque is communicated to the motor and to the engine. The engine governor attempts to compensate for this increased torque by supplying more fuel to the engine.

If the control is unable to maintain the motor at its commanded speed, one of two things can happen. If the motor is "motoring", driving the rotor by rotating in forward direction, the increased torque applied by the rotor to the motor will cause the motor to begin slowing down. The motor may eventually slow down to a complete halt (i.e. zero rpm). Typically, a rotor slug condition experienced when the motor is 'motoring' causes the engine to stop. However, it's possible that if the torque applied by the rotor to the motor is still too high, the motor will begin turning in its reverse direction (i.e. its velocity will become greater in greater in a negative direction), accelerating the motor faster and faster in the reverse direction until the motor eventually overspeeds in its reverse direction of rotation.

The motor speed test in step 320 checks to see whether the motor is rotating even faster than 3500 rpm in the reverse direction, both as measured by the motor speed sensor (the actual motor speed) and as calculated (the calculated motor speed) based upon the rotor speed sensor, the engine speed sensor and the currently selected gear ratio of gearbox 116. As in the case of the test in step 314, controller 234 must determine the direction of motor rotation as well as the speed of rotation. To do this, controller 234 is configured to determine the direction of motor rotation by looking at the rotor speed, the engine speed and/or the commanded pump displacement. Alternatively, a speed sensor that provides a signal not just indicative of speed, but indicative of direction of rotation as well can be used for the motor speed sensor.

If the rotor speed range is 3, controller 234 continues to step 314. In step 314, controller 234 checks whether both the actual motor speed and the calculated motor speed are greater in magnitude than 3000 rpm when the motor is turning in its reverse or negative direction for at least the previous 500 ms. Expressing this in slightly different language, controller 234 checks to see whether the actual motor velocity and the calculated motor velocity are less than (i.e. more negative than) −3000 rpm for at least the previous 500 ms. If so, controller 234 continues to step 316 and turns off the feeder and the rotor.

Typically, controller 234 will perform the three tests of step 318, 320, and 314 and will determine that the motor speed has not exceeded the three threshold speeds in these tests. Since the motor has not exceeded its speed thresholds, controller 234 will not continue to step 316 and turn off the feeder and rotor. Instead, in each of these three cases, controller 234 will continue to step 324 and perform to additional tests to determine whether incipient slugging exists. The first of these tests is illustrated in step 324. In step 324, controller 234 calculates the flow rate of hydraulic fluid produced by pump 110 and compares it to the flow rate of hydraulic fluid through motor 112. A substantial difference in flow rates between the pump 110 and the motor 112 indicates that a pressure relief valve (not shown) in the pump/motor hydraulic circuit has opened.

In the preferred embodiment, the threshold pump-to-motor flow rate difference determined in step 324 is 1000 cc/sec. If controller 234 calculates in step 324 that the pump 110 is outputting at least 1000 cc/sec of hydraulic fluid more than motor 112 is consuming, the answer to step 324 will be "yes" and controller 234 will continue processing at step 316 by turning off the feeder and the rotor.

Alternatively, and in the fifth test performed by controller 234 to determine in incipient slugging, controller 234 will continue to step 326 where it examines the deceleration slopes of the motor, the rotor, and the engine to determine whether the slopes exceed a threshold. Each of the motor, the rotor, and the engine has a different deceleration slope threshold. If all three of the motor, the rotor, and the engine meet these deceleration slope thresholds in step 326, then they are slowing down fast enough to indicate incipient slugging, and controller 234 will continue to step 328 in which it turns off the feeder, yet leaves the rotor running (e.g. keeps the engine to ring clutch engaged).

This response to incipient slugging is not as drastic as the response in the previous cases in which the motor is at risk of suffering immediate and catastrophic damage. The slope test of step 326 can be understood as a first response to incipient slugging that is escalated by shutting down the rotor if it fails to unload the rotor and the motor speed keeps decelerating (i.e. accelerating in a negative or backward direction of rotation) and eventually exceeds the limits of steps 318, 320, or 314, or if the difference in flow rates tested in step 324 indicate extremely high pressure on the motor, and thus the possibility that the motor's pressure relief valve will open, permitting the motor to overspeed extremely fast.

Referring back to the slope test of step 326, controller 234 is configured to test the slope with different slope threshold values based upon the current operating conditions of the combine. In particular, controller 234 uses one set of threshold slopes when the rotor is rotating at a speed above its midpoint speed, and uses a different set of threshold slopes when the rotor is rotating at a speed below the midpoint speed. The midpoint speed is the speed of the rotor (generally in the middle of each speed range) at which the motor is stationary. The midpoint (e.g. motor stationary) speed for rotor speed ranges 1, 2 and 3 are: 345, 610 and 915 RPM, respectively.

If the rotor is above the midpoint speed for its current speed range the three threshold slope values are −60 rpm per second for the engine 104, −40 rpm per second for the rotor 118, and −150 rpm per second for the motor 112. If the rotor is below the midpoint speed for its current speed range the three threshold slope values are −120 rpm per second for the engine 104, −60 rpm per second for the rotor 118, and −150 rpm per second for the motor 112.

As an example, assume the gearbox 116 is in third, or high gear. The rotor speed range will be three. Controller 234 reads the rotor speed sensor to determine what the rotor speed is. Controller 234 then determines, based on the rotor speed, and the dear range, whether the rotor speed is above or below the midpoint speed of that range. If it is above the midpoint speed in that range, controller 234 then calculates the slopes of engine, rotor, and motor speeds using the −60/−40/−150 rpm per second threshold slopes.

To calculate the slopes of the engine, rotor, and motor speeds, controller 234 is configured to read the speed signals from the engine, rotor, and motor speed sensors, and to compare those speed signals with previously measured speed signals to determine how fast the engine, rotor, and motor are dropping in speed. If the engine is dropping its speed at a rate greater than −60 rpm per second, AND the rotor is dropping in speed at a rate of greater than −40 rpm per second AND the motor is dropping in speed at a rate greater than −150 rpm per second, then the condition of step 326 has been met, and controller 234 continues processing at step 328. If not, if the three thresholds have not all been met, and controller 234 continues processing at step 322.

Again, when all three of the motor, rotor, and engine are decreasing in speed at a rate faster than their respective threshold deceleration slopes or rates, controller 234 turns off the feeder and leaves the rotor running in step 328. This recognizes that the incipient slugging is not critical, and that the rotor may be able to clear itself, given enough time, if the feeder is turned off. By turning off the feeder, no additional plant matter is forced into the inlet of the rotor, and hence no additional load is placed on the rotor as it clears itself.

It will be obvious to those skilled in the art that various changes may be made without departing from the scope of the invention and the invention is not considered to be limited to what is illustrated in the drawings and described in the specification.

For example, any one or more of controllers of FIG. 2 can be configured to perform the steps, method, or process illustrated in FIG. 3.

Further, the particular time intervals in the test can be set to any time interval desired based upon the particular components used in combine 100. Either longer or shorter intervals can work just as well, which would again depend upon the components chosen.

Further, the various threshold speeds need not be the exact speeds identified above. The speeds identified above were chosen because of the particular characteristics of the pump, motor, engine, and rotor and their interconnections. Systems constructed differently, with different components will almost certainly have different optimal threshold speeds.

Further, the threshold times need not be the particular times identified above. The times should be optimized for the particular components selected for use in combine 100.

Further, the three controllers shown here can include microprocessors, or microcontrollers. They can be operated optically pneumatically or hydraulically. A single controller can be configured to provide all the controller functions described herein. Further two, four or more controllers can provide the functions. They can be dedicated controllers or they may be configured to perform additional related or unrelated functions.

The speed sensors can be Hall effect, light sensing or capacitive sensors. The speed sensors can be velocity sensors. They can generate a signal indicative of both direction of rotation and speed.

The motor can be a variable displacement motor and the pump can be a fixed displacement motor.

We claim:

1. A method to sense incipient slugging in a combine having a rotor for threshing crop material, an internal combustion engine configured to be coupled to the rotor to drive the rotor; and a hydraulic motor configured to be coupled to the rotor to drive the rotor, the method comprising the steps of:
    sensing a first motor speed with a motor speed sensor;
    sensing an engine speed with an engine speed sensor;
    sensing a rotor speed with a rotor speed sensor;
    a controller combining the engine speed and the rotor speed to provide a second motor speed;
    the controller determining incipient slugging based upon the first motor speed and the second motor speed;
    wherein if slugging is determined, disengaging the rotor from both the engine and the motor;
    wherein if slugging is not determined, determining rates of change of a signal from the motor speed sensor, a signal from the engine speed sensor and a signal from the rotor speed sensor; and
    determining incipient slugging based upon the three rates of change.

2. The method of claim 1, wherein the motor is driven by a hydraulic pump, the method further comprising the steps of, the controller:
    determining a first flow rate of hydraulic fluid through the pump;
    determining a second flow rate of hydraulic fluid through the motor;
    determining a difference between the first and second flow rates, and
    determining incipient slugging based upon the difference.

3. The method of claim 1, wherein the step of determining incipient slugging further comprises the steps of, the controller:

selecting a first threshold motor speed based at least upon a first selected gear ratio; and comparing the first and second motor speeds with the first threshold motor speed.

4. The method of claim 3, further comprising the step of:
the controller comparing the first and second motor speeds against a second threshold motor speed different from the first threshold motor speed when a second gear ratio different from the first gear ratio is selected.

5. The method of claim 1, further comprising the step of:
disengaging the rotor from both the engine and the motor based at least upon the steps of determining.

6. A system to sense incipient slugging in a combine having a rotor for threshing crop material, an internal combustion engine configured to be coupled to the rotor to drive the rotor; and a hydraulic motor configured to be coupled to the rotor to drive the rotor, the system comprising:

at least one electronic controller;

a motor speed sensor coupled to the at least one electronic controller and to the motor to sense a first motor speed;

an engine speed sensor coupled to the at least one electronic controller and to the engine to sense the engine speed; and a rotor speed sensor coupled to the at least one electronic controller and to the rotor to sense the rotor speed;

wherein the electronic controller is configured to
receive an engine speed signal from the engine speed sensor,
receive a rotor speed signal from the rotor speed sensor,
combine the engine speed signal and the rotor speed signal to provide a second motor speed, and
determine incipient slugging based upon the first motor speed and the second motor speed, wherein the motor is driven by a hydraulic pump and, when incipient slugging is not determined, the controller is further configured to:

determine a first flow rate of hydraulic fluid through the pump;

determine a second flow rate of hydraulic fluid through the motor;

determine a difference between the first and second flow rates; and determine incipient slugging based upon the difference.

7. The system of claim 6, wherein the controller is further configured to;
determine rates of change of the motor speed signal, the engine speed signal and the rotor speed signal; and
determine incipient slugging based upon the three rates of change.

8. The system of claim 6, wherein the controller is further configured to:
select a first threshold motor speed based at least upon a first selected gear ratio; and
compare the first and second motor speeds with the first threshold motor speed.

9. The system of claim 8, wherein the controller is further configured to:

compare the first and second motor speeds against a second threshold motor speed different from the first threshold motor speed when a second gear ratio different from the first gear ratio is selected.

10. The system of claim 6, wherein the controller is further configured to:
disengage the rotor from both the engine and the motor based at least upon the step of determining.

11. A system to sense incipient slugging in a combine having a rotor for threshing crop material, an internal combustion engine configured to be coupled to the rotor to drive the rotor; and a hydraulic motor configured to be coupled to the rotor to drive the rotor, the system comprising:

means for sensing a first motor speed;
means for sensing engine speed;
means for sensing rotor speed; and
electronic control means, the control means further comprising:
means for receiving an engine speed signal from the means for sensing engine speed;
means for receiving a rotor speed signal from the means for sensing rotor speed;
means for combining the engine speed signal and the rotor speed signal to provide a second motor speed; and
means for determining incipient slugging based upon the first motor speed and the second motor speed;
means for disengaging the rotor from both the engine and the motor when incipient slugging is determined.

12. The system of claim 11, wherein the means for controlling further comprises:
means for determining rates of change of the motor speed signal, the engine speed signal and the rotor speed signal; and
means for determining incipient slugging based upon the three rates of change.

13. The system of claim 11, wherein the motor is driven by a hydraulic pump and the means for controlling further comprises:
means for determining a first flow rate of hydraulic fluid through the pump;
means for determining a second flow rate of hydraulic fluid through the motor;
means for determining a difference between the first and second flow rates; and
means for determining incipient slugging based upon the difference.

14. The system of claim 11, wherein the means for controlling further comprises:
means for selecting a first threshold motor speed based at least upon a first selected gear ratio; and
means for comparing the first and second motor speed with the first threshold motor speed.

15. The system of claim 14, wherein the means for controlling further comprises:
means for comparing the first and second motor speed against a second threshold motor speed different from the first threshold motor speed when a second gear ratio different from the first gear ratio is selected.

* * * * *